United States Patent [19]

Kurosawa et al.

[11] Patent Number: 5,446,363
[45] Date of Patent: Aug. 29, 1995

[54] METHOD OF CONTROLLING INDUCTION MOTOR

[75] Inventors: Ryoichi Kurosawa, Kokubunji; Hajime Yamamoto, Tama, both of Japan

[73] Assignee: Kabushiki Kaisha Toshiba, Kawasaki, Japan

[21] Appl. No.: 109,501

[22] Filed: Aug. 20, 1993

[30] Foreign Application Priority Data

Feb. 5, 1993 [JP] Japan .................................. 5-018867

[51] Int. Cl.$^6$ ............................................ H02P 5/40
[52] U.S. Cl. ..................................... 318/806; 318/821
[58] Field of Search .............. 318/806, 800, 801, 803, 318/805, 807, 808, 809, 818, 821

[56] References Cited

U.S. PATENT DOCUMENTS

| | | | |
|---|---|---|---|
| 4,259,629 | 3/1981 | Kurosawa | 318/807 |
| 4,267,499 | 5/1981 | Kurosawa | 318/800 |
| 4,780,658 | 10/1988 | Koyama | 318/808 |
| 4,814,683 | 3/1989 | Okamoto et al. | 318/803 |
| 4,862,343 | 8/1984 | Nomura et al. | 318/802 |
| 5,003,243 | 3/1991 | Tadakuma et al. | 318/808 |
| 5,264,773 | 11/1993 | Koyama et al. | 318/807 |
| 5,270,498 | 12/1993 | Tanahashi | 318/801 |

FOREIGN PATENT DOCUMENTS 57-38116  8/1982  Japan .

OTHER PUBLICATIONS

Kurosawa et al., "Block Diagram And Vector Control Of An Induction Motor With Magnetic Saturation", Abstract, 1992 National Convention Record I.E.E. Japan, Industry Applications Society.

*Primary Examiner*—William M. Shoop, Jr.
*Assistant Examiner*—John W. Cabeca
*Attorney, Agent, or Firm*—Foley & Lardner

[57] ABSTRACT

There is disclosed a method of controlling an induction motor, which controls a primary current of the induction motor on the basis of a magnetic flux component current command $i_{1d}{}^*$, a torque component current command $i_{1q}{}^*$, and a slip frequency command $\omega_s$ which are orthogonal component command values of the primary current of the induction motor, wherein control parameters $R_2{}^*$, $l_2{}^*$ and $M^*$ set in accordance with a secondary resistance $R_2$, a secondary leakage inductance $l_2$ and a mutual inductance $M$ of the induction motor are used to calculate the magnetic flux component current command $i_{1d}{}^*$, the torque component current command $i_{1q}{}^*$ and the slip frequency command $\omega_s$. Even in the case where the mutual inductance $M$ of the induction motor varies, if the coefficient $1/M^*$ is assumed as a magnetic saturation function given by a gap magnetic flux, the influence of the magnetic saturation can be canceled.

16 Claims, 5 Drawing Sheets

METHOD OF CONTROLLING INDUCTION MOTOR

BACKGROUND OF THE INVENTION

1. Field of the Invention

This invention relates to a method of controlling an induction motor power-fed by a power converter.

2. Prior Art

In recent years, as a method of power-feeding and controlling an induction motor by using a power converter, there has been developed a control method called a vector control to deal with current and/or magnetic flux, etc. of the induction motor as a vector quantity to control them. By such vector control, it has become possible to stably control an induction motor by a quick response like a d.c. motor. Thus, induction motors have been widely used as control motors.

Meanwhile, although there is a limitation in an output maximum voltage of a power converter for feeding a power to an induction motor, since the induced voltage becomes high when the rotational speed becomes high, the induction motor is brought into an uncontrollable state when the rotational speed is above a predetermined value. For this reason, there has been carried out a magnetic flux weakening control to weaken magnetic flux to thereby lower an induced voltage to permit control up to a higher speed rotational region. In order to weaken the magnetic flux, it is sufficient to allow the magnetic flux component current of the induction motor to be small. However, since the secondary winding of the induction motor is generally in a short-circuited state, damper action takes place, so a current to cancel a change in the magnetic flux component current transiently flows in the secondary winding. For this reason, the magnetic flux cannot vary immediately. A method of solving such a problem is disclosed in JP-B 57-38116 (the Japanese Patent Publication No. 38116/1982). In the method disclosed in this literature, it is assumed that the inductance of the induction motor is fixed. However, in actual induction motors, the inductance may vary by magnetic saturation. In speed control of general induction motors, there is not a serious problem in practical use although such magnetic saturation is not taken into consideration. Meanwhile, in recent years, such uses of induction motors to control the torque are increasing. In such cases of controlling the torque of the induction motor, if the influence of the magnetic saturation is neglected, it is impossible to attain quick-responding, stable and high accuracy control.

SUMMARY OF THE INVENTION

Accordingly, an object of this invention is to provide a method of controlling an induction motor, which can stably carry out vector control of an induction motor with high accuracy and quick response by taking into consideration the influence of magnetic saturation.

To achieve this object, in accordance with this invention, there is provided a method of controlling an induction motor, which controls a primary current of the induction motor on the basis of a magnetic flux component current command ($i_{1d}*$), a torque component current command ($i_{1q}*$), and a slip frequency command ($\omega_s$) which are orthogonal component command values of the primary current of the induction motor calculated from a secondary magnetic flux command ($\Phi_2*$) and a torque command ($T*$) of the induction motor, characterized in that control parameters $R_2*$, $l_2*$ and $M*$ set in accordance with a secondary resistance $R_2$, a secondary leakage inductance $l_2$ and a mutual inductance $M$ of the induction motor are used to calculate the magnetic flux component current command ($i_{1d}*$), the torque component current command ($i_{1q}*$) and a slip frequency command ($\omega_s$) by the following equations:

$$i_{1d}* = (d\Phi_2*/dt)/R_2* + (\Phi_2* + (d\Phi_2*/dt)/R_2* \times l_2*)/M*$$

$$i_{1q}* = T*/\Phi_2* + (T*/\Phi_2* \times l_2)/M*$$

$$\omega_s = T*/\Phi_2*^2 \times R_2*$$

Further, in accordance with this invention, there is provided a method of controlling an induction motor. The method controls a primary current of the induction motor on the basis of a magnetic flux component current command ($i_{1d}*$) and a torque component current command ($i_{1q}*$) which are orthogonal component command values of the primary current of the induction motor calculated from a secondary magnetic flux command ($\omega_2*$) and a slip frequency command ($\omega_s$) of the induction motor, characterized in that control parameters $R_2*$, $l_2*$ and $M*$ set in accordance with a secondary resistance $R_2$, a secondary leakage inductance $I_2$ and a mutual inductance $M$ of the induction motor are used to calculate the magnetic flux component current command ($i_{1d}*$) and the torque component current command ($i_{1q}*$) by the following equations:

$$i_{1d}* = (d\Phi_2*/dt)/R_2* + (\Phi_2* + (d\Phi_2*/dt)/R_2* \times l_2*)/M*$$

In accordance with this invention, even if the inductance of the induction motor varies, a primary current command is calculated in accordance with such a control operational expression capable of canceling that change to control a primary current of the induction motor on the basis of the primary current command by using a power converter.

For an analysis of the transient characteristic, etc. of the induction motor, a voltage/current differential equation of the induction motor is used. A voltage/current differential equation using complex variables of a squirrel-cage motor can be expressed by the following equation (1), and the torque thereof can be expressed by the following equation (2). It is to be noted that the the number of pairs of poles is set to 1.

$$\begin{pmatrix} v_{1S} \\ 0 \end{pmatrix} = \begin{pmatrix} sL_1 + R_1 & sM \\ sM - j\omega_r M s L_2 + & R_2 - j\omega_r L_2 \end{pmatrix} \begin{pmatrix} i_{1S} \\ i_{2S} \end{pmatrix} \quad (1)$$

$$T = Im(M \overline{i_{2S}} i_{1S}) \quad (2)$$

where $v_{1S}$ is a primary voltage, $0(v_{2S})$ is a secondary voltage, $R_1$ is a primary resistance, $R_2$ is a secondary resistance, $\omega_r$ is a rotor angular velocity, T is a torque, j is an imaginary unit, $\overline{a_s}$ is a conjugate complex number of $a_s$, $i_{1S}$ is a primary current, $i_{2S}$ is a secondary current, $L_1$ is a primary inductance, $L_2$ is a secondary inductance, M is a mutual inductance, s is a differential operator d/dt, and $Im(a_s)$ is an imaginary part nary part of $a_s$.

It is to be noted that, in the above-mentioned equation (1), for example, voltage v and current i, etc. expressed by bold face are complex variables.

The complex variable $a_s$ can be expressed by combination of the real part $a_{ds}$ and the imaginary part $a_q$ ($a_s = a_{ds} + ja_{qs}$). Namely, the above-mentioned equation (1) is equivalent to the equation of four rows by four columns in general orthogonal (rectangular) coordinates in the case where the real part and the imaginary part are respectively caused to be in correspondence with the $d_s$ axis and the $q_s$ axis, and the rotational direction of $\omega_r$, etc. is set so that the counterclockwise direction from the $d_s$ axis to the $q_s$ axis is positive. Since the differential term of the equation (1) is originally a term showing a voltage by magnetic flux change, the position of the differential operator s is before $L_1$, $L_2$, $M$. Namely, this differentiation is not a differentiation of a current, but is a differentiation of inductance x current (e.g., $L_1 i_{1s}$) which is the dimension of magnetic flux. Here, $v_{1S}$, $i_{1S}$ and $i_{2S}$ are replaced as follows:

$$\left. \begin{array}{l} v_{1S} = v_1 e^{j\theta_0} \\ i_{1S} = i_1 e^{j\theta_0} \\ i_{2S} = i_2 e^{j\theta_0} \end{array} \right\} \quad (3)$$

In the above equation, $\theta$ is an arbitrary angle.

$v_1$, $i_1$, $i_2$ can be interpreted as values on the d-q coordinates (orthogonal coordinates) obtained by rotating the $d_s q_s$ axis by $\theta_0$. This substitution is equivalent to the rotational coordinate transform. In order to rewrite the equation (1) into the relationship of values on the coordinates rotating at an angular velocity $\omega_0 = d\theta_0/dt$, it is sufficient that $s + j\omega_0$ is substituted for s.

Accordingly, the voltage/current differential equation on the coordinates rotating at an angular velocity $\omega_0$ is expressed by the following equation (4) or (5), and the torque is expressed by the following equation (6).

$$\begin{pmatrix} v_1 \\ 0 \end{pmatrix} = \begin{pmatrix} sL_1 + R_1 + j\omega_0 L_1 & sM + j\omega_0 M \\ sM + j\omega_s M & sL_2 + R_2 + j\omega_s L_2 \end{pmatrix} \begin{pmatrix} i_1 \\ i_2 \end{pmatrix} \quad (4)$$

$$[v] = (s[L] + [R] + j[\omega][L])[i] \quad (5)$$

$$T = Im(M \overline{i_2} i_1) \quad (6)$$

where $\omega_0 = d\theta_0/dt$
$\omega_s = \omega_0 - \omega_r$ $$[v] = \begin{pmatrix} v_1 \\ 0 \end{pmatrix} [i] = \begin{pmatrix} i_1 \\ i_2 \end{pmatrix}$$

$$[L] = \begin{pmatrix} L_1 & M \\ M & L_2 \end{pmatrix} [R] = \begin{pmatrix} R_1 & 0 \\ 0 & R_2 \end{pmatrix}$$

$$[\omega] = \begin{pmatrix} \omega_0 & 0 \\ 0 & \omega_s \end{pmatrix}$$

In the case of solving the differential equation of the above-mentioned equation (5) by simulation, etc., differential terms are put together at the left side as indicated by the following equation (7):

$$s[L][i] = [v] - ([R] + j[\omega][L])[i] \quad (7)$$

$[L]^{-1}$ is multiplied from the left side:

$$[L]^{-1} s[L][i] = [L]^{-1}[v] - ([L]^{-1}[R] + j[\omega])[i] \quad (8)$$

If $[L]$ is constant, $[L]^{-1} s[L]$ is equal to s. Accordingly, $$s[i] = [L]^{-1}[v] - ([L]^{-1}[R] + j[\omega])[i] \quad (9)$$

This differential equation is dealt as an equation of state with the current [i] being as a state parameter. However, in the case where [L] cannot be regarded as a constant by magnetic saturation, etc., $[L]^{-1} s[L]$ is not equal to s. Therefore, the equation (9) does not hold, failing to obtain a correct solution. The control method disclosed in the reference JP-B 57-38116 (the Japanese Patent Publication No. 38116/1982) is based on such an analysis technique.

In the case where [L] cannot be regarded as a constant by magnetic saturation, etc.,[L] [i] at the left side of the equation (7) is replaced by [Φ]. This parameter is selected as a state parameter.

$$[\Phi] = [L][i] \quad (10)$$

$$= \begin{pmatrix} \Phi_1 \\ \Phi_2 \end{pmatrix} \begin{pmatrix} L_1 i_1 + M i_2 \\ M i_1 + L_2 i_2 \end{pmatrix}$$

Accordingly, the following relationship holds.

$$[i] = [L]^{-1}[\Phi] \quad (11)$$

$\Phi_1$ is a magnetic flux interlinking with the primary winding, which is called a primary magnetic flux, and $\Phi_2$ is a magnetic flux interlinking with the secondary winding, which is called a secondary magnetic flux. Replacement of [L] [i] of the equation (7) by [Φ] gives the following equation (12). Further, substitution of the equation (11) into the equation (12) gives the following equation (13).

$$s[\Phi] = [v] - [R][i] - j[\omega][\Phi] \quad (12)$$

$$s[\Phi] = [v] - ([R][L]^{-1} + j[\omega])[\Phi] \quad (13)$$

Even in the case where the motor parameters vary, [Φ] can be correctly solved, and [i] is indirectly calculated by the equation (11) from [Φ]. Accordingly, if a control method is determined on the basis of the above analysis method, it is possible to cope with a change of the inductance by magnetic saturation.

A block diagram of an induction motor in accordance with the above analysis method in the case of controlling a primary current by a power converter will now be determined. In the case of controlling a primary current, the equations related to the primary side are unnecessary, and the equations of the portion relating to the secondary side in the equations (12) and (10) are the following equations (14) and (15), respectively.

$$s\Phi_2 = -R_2 i_2 - j\omega_s \Phi_2 \quad (14)$$

$$\Phi_2 = M i_1 + L_2 i_2 \quad (15)$$

On the basis of the idea that the mutual inductance M varies by magnetic saturation in an induction motor, the secondary inductance $L_2$ is decomposed into the secondary leakage inductance $l_2$ and the mutual inductance M.

$$L_2 = l_2 + M \tag{16}$$

Substitution of the above-mentioned relationship into the equation (15) gives:

$$\Phi_2 = M(i_1 + i_2) + l_2 i_2 \tag{17}$$

Accordingly, $$-i_2 = i_1 - \frac{\Phi_2 - l_2 i_2}{M} \tag{18}$$

When a block diagram of the induction motor with respect to the primary current $i_1$ is depicted from the equations (14) and (18), FIG. 1 is obtained. Inputs/outputs of respective blocks shown in the figure have the following relationships in connection with the physical quantity:

$\Phi l_2 = l_2 i_2$: Secondary leakage magnetic flux $\Phi_0 = \Phi_2 - \Phi l_2$: Gap magnetic flux (magnetic flux commonly interlinking with the primary and secondary windings)

$i_0 = \frac{\Phi_0}{M} = i_1 + i_2$: Excitation current

Namely, a difference between the primary current $i_1$ and the excitation current $i_0$ is a secondary current $-i_2$ of a negative sign. Since the secondary winding of the squirrel-cage motor is in a short-circuited state, the sum of the voltage drop $R_2 i_2$ by the secondary resistance, speed electromotive voltage $j \omega_s \Phi_2$ by the secondary magnetic flux, and voltage $s\Phi_2$ by a change in the secondary magnetic flux is equal to zero. Integration of $-R_2 i_2 - j\omega_s \Phi_2$ gives a secondary magnetic flux $\Phi_2$. A difference between the secondary magnetic flux and the secondary leakage magnetic flux is a gap magnetic flux $\Phi_0$. A current obtained by dividing the gap magnetic flux $\Phi_0$ by the mutual inductance is an excitation current $i_0$.

In the case where it can be considered that the primary current (actual value) $i_1$ is controlled so that it is equal to a primary current command $i_1^*$ and the induction motor is controlled by a current source, if the inverse block of the block diagram from the primary current $i_1$ up to the secondary magnetic flux $\Phi_2$ is assumed as a controller as shown in FIG. 2, the transfer function from the secondary magnetic flux command $\Phi_2^*$ up to the secondary magnetic flux $\Phi_2$ is caused to be a constant. In this case, $\omega_s$ may take an arbitrary value. In FIG. 2, asterisk (*) is attached to motor parameters used in the controller.

The torque T is expressed as the following equation (19) by using the secondary magnetic flux $\Phi_2$:

$$T = \frac{M}{L_2} Im(\overline{\Phi}_2 i_1) \tag{19}$$

For simplifying the controller, the secondary magnetic flux command $\Phi_2^*$ is considered to be comprised of only the real part $\Phi_2^*$. If the parameters of the controller are equal to motor parameters, the secondary magnetic flux is equal to the command value $\Phi_2^*$, and only the real part is controlled. In this case, the relationship expressed as $\Phi_2 = \Phi_2^* = \Phi_2^*$ holds. The torque T is expressed by the following equation (20).

$$\begin{aligned} T &= \frac{M}{L_2} Im(\overline{\Phi}_2 i_1) = \frac{M}{L_2} \Phi_2^* Im(i_1^*) \\ &= \frac{M}{L_2} \Phi_2^* \left(1 + \frac{l_2}{M}\right) \frac{\omega_s \Phi_2^*}{R_2} \\ &= \frac{\omega_s}{R_2} \Phi_2^{*2} \end{aligned} \tag{20}$$

Accordingly, if a selection is made such that $\omega_s$ ($= \omega_0 - \omega_r$) is expressed as the following equation (21), the torque transfer function is also caused to be a constant.

$$\omega_s = \frac{R_2}{\Phi_2^{*2}} T^* \tag{21}$$

From these relationships, the controller of the vector control for allowing the transfer functions of the secondary magnetic flux and the torque of the induction motor to be a constant is as shown by the block diagram of FIG. 4. The induction motor is controlled in accordance with a primary current calculated in accordance with this block diagram.

While an explanation has been given by using equations as mentioned above, the key point is as follows. Namely, the fact that differentiation of the differential equation of an induction motor is not differentiation of a current, but differentiation of magnetic flux, is taken into consideration to determine a block diagram of the induction motor which holds even when the inductance varies by magnetic saturation to allow a block diagram which has the reversed relationship with respect to the above-mentioned block to serve as a controller. Accordingly, even when there is any magnetic saturation, if control parameters used in the control operation are adjusted in correspondence with parameters of the induction motor, it is possible to precisely control the induction motor by a quick response both transiently and steadily. It is sufficient that $1/M^*$ is caused to be a saturation function with respect to the magnetic saturation of the mutual inductance M. In addition, it is sufficient that, also with respect to other induction motor parameters, control parameters corresponding thereto are caused to be in a suitable function form.

DESCRIPTION OF THE PREFERRED EMBODIMENTS

Preferred embodiments of this invention will now be described with reference to the attached drawings.

Figure 3:
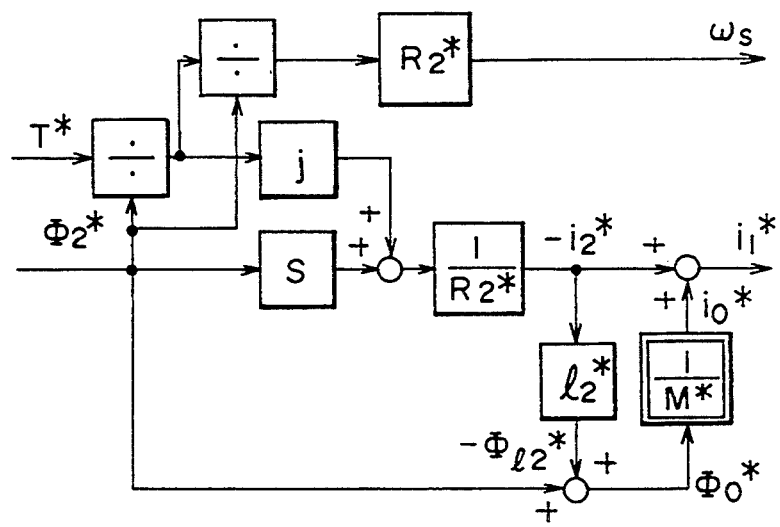
Figure 4:
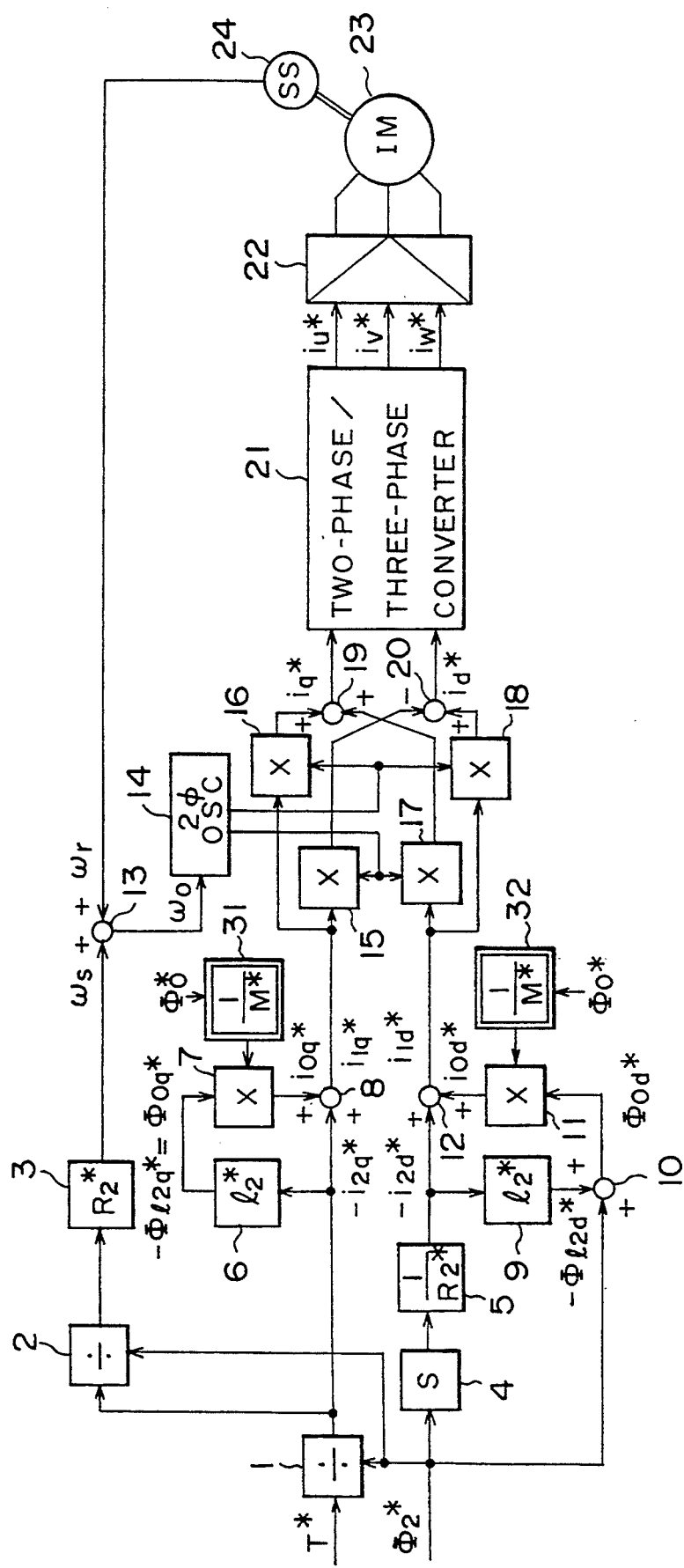
FIG. 4 shows a block diagram of an apparatus used in a first embodiment of this invention.

FIG. 4 shows the example where the control block indicated by using complex variables in FIG. 3 is embodied. This control apparatus comprises dividers 1 and 2, coefficient elements 3, 5, 6, and 9, a differentiator 4, adding/subtracting elements 8, 10, 12, 13, 19 and 20, a two-phase sine wave generator 14, multipliers 7, 11, 15, 16, 17 and 18, function generators 31 and 32, a two-phase/three-phase converter 21, a power converter 22, and a speed detector 24. By this control apparatus, the primary current of an induction motor 23 is controlled. A magnetic flux command $\Phi_2$ and a torque command T* are given to the control apparatus. At the circuit sections indicated by reference numerals 1-12, a slip frequency command $\omega_s$, a magnetic flux component current command $i_{1d}*$ and a torque component current command $i_{1q}*$ are calculated. In accordance with these calculated command $\omega_s$, $i_{1d}*$ and $i_{1q}*$, the induction motor 23 is controlled at the circuit sections indicated by reference numerals 13-22.

At the divider 1, the torque command T* is divided by the secondary magnetic flux command $\Phi_2*$. As a result, $-i_{2q}*$ is determined by calculation. This $-_{2q}*$ is further divided by the secondary magnetic flux command $\Phi_2*$ at the divider 2, and an output from the divider 2 is multiplied by a coefficient $R_2*$ corresponding to the secondary resistance of the induction motor at the coefficient element 3. Thus, slip frequency command $\omega_s$ is determined by calculation. Accordingly, the slip frequency command $\omega_s$ has the relationship expressed by the following equation (22):

$$\omega_s = T^*/\Phi_2^{*2} \times R_2^* \qquad (22)$$

On the other hand, output $-i_{2q}*$ of the divider 1 is multiplied by a coefficient $l_2*$ corresponding to the secondary leakage inductance of the induction motor at the coefficient element 6, and an output from the coefficient element 6 is multiplied by a coefficient 1/M* corresponding to the inverse number of the mutual inductance of the induction motor at the multiplier 7. Thus, $i_{0q}*$ is determined by calculation. The coefficient 1/M* is obtained by the function generator 31 on the basis of gap magnetic flux $\Phi_0*$. Further, $-i_{2q}*$ and $i_{0q}*$ are added by the adding/subtracting element 8. Thus, a torque component current command $i_{1q}*$ is determined by calculation. Accordingly, the torque component current command $i_{1q}*$ has the relationship expressed by the following equation (23):

$$i_{1q}* = T^*/\Phi_2 + (T^*/\Phi_2^* \times l_2^*)/M^* \qquad (23)$$

The magnetic flux component current command $i_{1d}*$ is calculated from the secondary magnetic flux command $\Phi_2$. The secondary magnetic flux command $\Phi_2$ is differentiated at the differentiator 4. An output from the differentiator 4 is multiplied by a coefficient $1/R_2*$ corresponding to the inverse number of the secondary resistance of the induction motor at the coefficient element 5. Thus, $-i_{2d}*$ is determined by calculation. Then, $-i_{2d}*$ is multiplied by a coefficient $l_2*$ corresponding to the secondary leakage inductance of the induction motor at the coefficient element 9. The secondary magnetic flux command $\Phi_2*$ is further added to the above operation result (an output from the coefficient element 9) at the adding/subtracting element 10. Thus, $\Phi_{0d}*$ is obtained. The value $\Phi_{0d}*$ thus obtained is multiplied by a coefficient 1/M* corresponding to the inverse number of the mutual inductance of the induction motor at the coefficient element 11. Thus, $i_{0d}*$ is determined by calculation. The coefficient 1/M* is obtained by the function generator 32 on the basis of gap magnetic flux $\Phi_0*$ in the same manner as in the case of the above-mentioned gap magnetic flux $\Phi_0*$. At the adding/subtracting element 12, $-i_{2d}*$ and $i_{0d}*$ are added. Thus, a magnetic flux component current command $i_{1d}*$ is determined by calculation. Accordingly, the magnetic component current command $i_{1d}*$ has the relationship expressed by the following equation (24):

$$i_{1d}* = (d\Phi_2^*/dt)/R_2^* + (\Phi_2^* + (d\Phi_2^*/dt)/R_2^* \times l_2^*)/M^* \qquad (24)$$

At the adding/subtracting element 13, the slip frequency command $\omega_s$ and a speed frequency $\omega_r$ detected by a speed detector 24 are added. Thus, a synchronous frequency $\omega_0$ is obtained. A two-phase sine wave of the synchronous frequency $\omega_0$ is generated by the two-phase sine wave generator 14. On the basis of the two-phase sine wave, by using multipliers 15-18, and adding/subtracting elements 19, 20, the magnetic component current command $i_{1d}*$ and the torque component current command $i_{1q}*$ are converted to two-phase a.c. current commands $i_d*$ and $i_q*$. Further, these two-phase a.c. current commands $i_d*$ and $i_q*$ are converted to three-phase a.c. current commands $i_u*$, $i_v*$, $i_w*$ by the two-phase/three-phase converter 21. In accordance with the three-phase a.c. current commands, three-phase a.c. primary currents of the induction motor 23 are controlled by the power converter 22.

In the case where, in the apparatus of FIG. 4, the mutual inductance M of the induction motor can be considered to be fixed and a corresponding controller coefficient M* can be considered to be fixed, it is possible to stably control the induction motor by a quick response while controlling the secondary magnetic flux with the magnetic flux component current command $i_{1d}*$ and the secondary magnetic flux command $\Phi_2*$ having a fixed relationship therebetween.

In the case where, in the previously described embodiment, the mutual inductance M of the induction motor varies by magnetic saturation, a corresponding controller coefficient 1/M* set at the multiplier 7, 11 is caused to be a saturation function $f(\Phi_0*)$ which varies in correspondence with saturation of gap magnetic flux $\Phi_0*$ of the induction motor. It is to be noted that the magnitude of the gap magnetic flux $\Phi_0$ is the square root of the sum of the squares of an output $\Phi_{0q}*$ of the coefficient element 6 and an output $\Phi_{0d}*$ of the adding/subtracting element 10.

$$\Phi_0^* = \sqrt{\Phi_{0d}^{*2} + \Phi_{0q}^{*2}}$$

Figure 5:
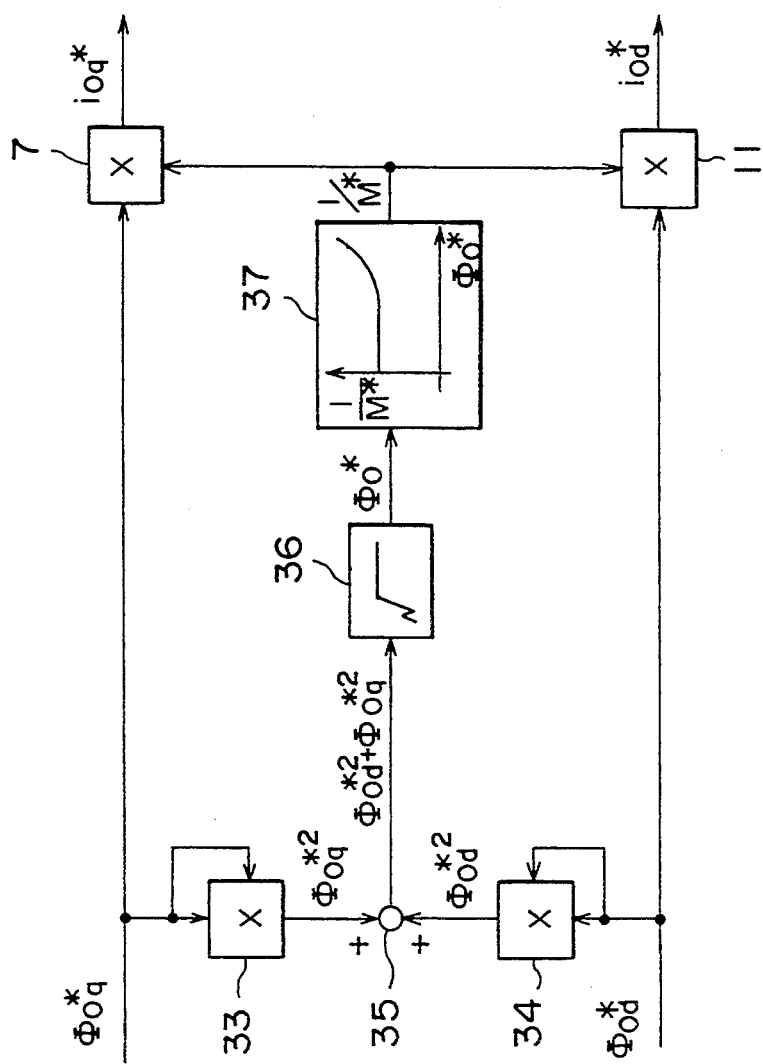
FIG. 5 shows a block diagram of the function portion relating to magnetic saturation of an induction motor.

FIG. 5 shows an example of the configuration of the function generator for calculating gap magnetic flux $\Phi_0*$ and saturation function $f(\Phi_0)$. $\Phi_{0q}^{*2}$ obtained by squaring an output $\Phi_{0q}*$ of the coefficient element 6 by using a multiplier 33 and $\Phi_{0d}^{*2}$ obtained by squaring an output $\Phi_{0d}*$ of the adder 10 by using a multiplier 34 are added by an adding/subtracting element 35. Thus, $\Phi_{0q}^{*2} + \Phi_{0d}^{*2}$ is obtained. By calculating square root of $\Phi_{0q}^{*2}$ and $\Phi_{0d}^{*2}$ by using an element 36 for extraction of the square root, gap magnetic flux $\Phi_0*$ is determined. By inputting this gap magnetic flux $\Phi_0*$ to a function generator 37, a coefficient 1/M*, i.e., a saturation function $f(\Phi_0*)=1/M*$ is determined. By multiplying output $\Phi_{0q}^*$ of the coefficient element 6 and output $\Phi_{0d}^*$ of the adding/subtracting element 10 by the coefficient 1/M* determined by the function generator 37 (corresponding to function generators 31, 32 of FIG. 4) by using multipliers 7, 11 $i_{0q}^*$ and $i_{0d}^*$ in which magnetic saturation is taken into consideration are obtained. The function generator 37 varies in such a manner that when the gap magnetic flux $\Phi_0^*$ is small, the coefficient M* is fixed, i.e., the coefficient 1/M* is fixed, while when the gap magnetic flux $\Phi_0^*$ becomes large, the coefficient M* is saturated so that it rapidly becomes small, i.e., the coefficient 1/M* rapidly becomes large. This function is set on the basis of the result obtained by actually measuring the relationship between the gap magnetic flux $\Phi_0^*$ and the mutual inductance M of the induction motor.

In accordance with the above-described embodiment, the influence of magnetic saturation can be canceled. Even if there is any magnetic saturation, it is possible to stably control the induction motor by a quick response while precisely controlling the secondary magnetic flux.

Figure 1:
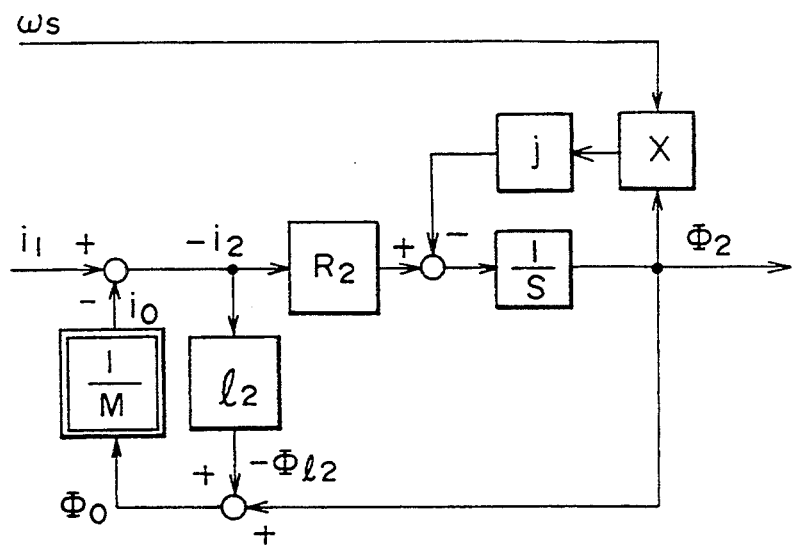
FIGS. 1 to 3 show block diagrams for explaining the principle of this invention, respectively.
Figure 2:
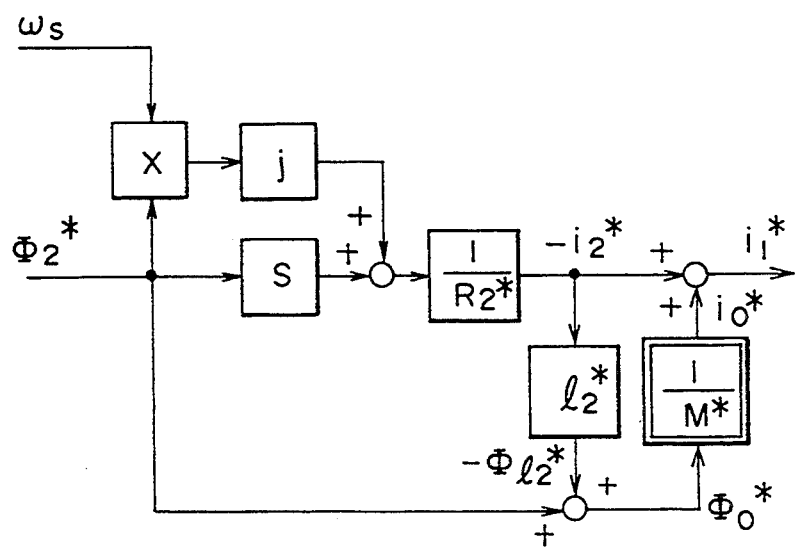
Figure 6:
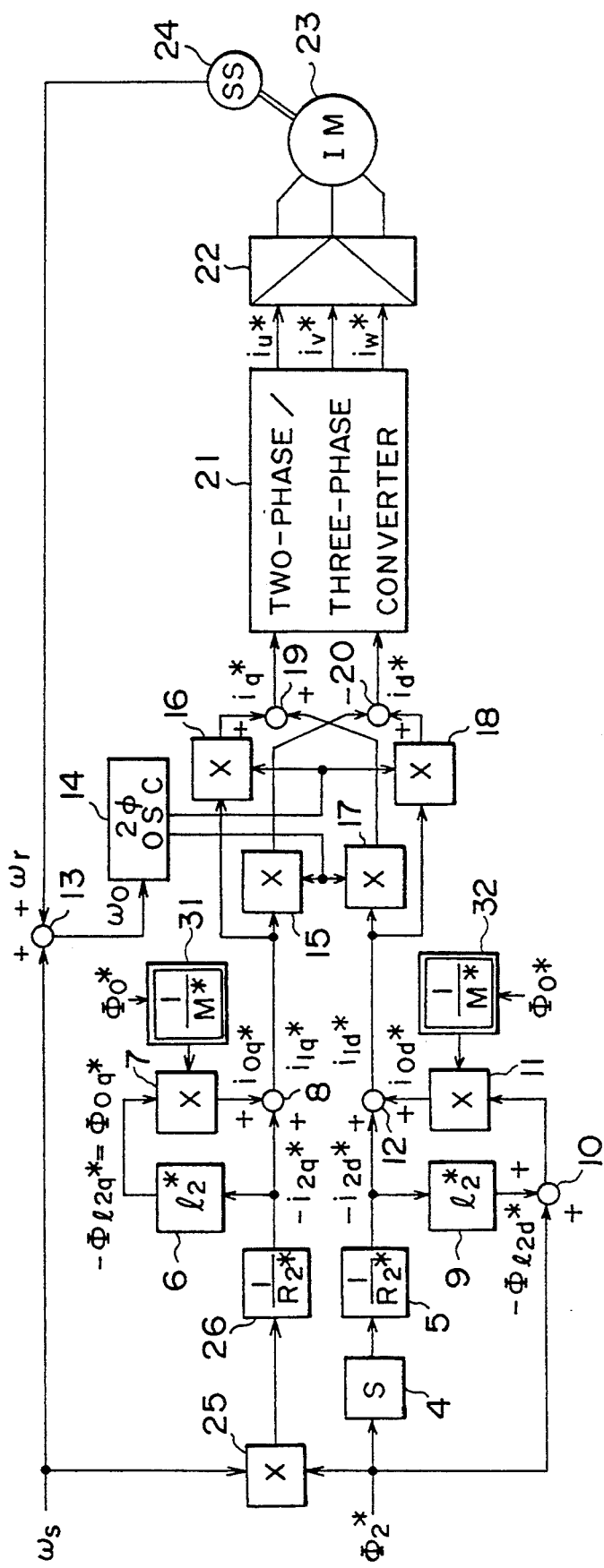
FIG. 6 shows a block diagram of an apparatus used in a second embodiment of this invention.

A second embodiment of this invention will now be described. FIG. 6 shows the example where the control block using complex variables of FIG. 2 is embodied. This embodiment shows an example of the configuration in the case where a slip frequency command $\omega_s$ and a secondary magnetic flux command $\Phi_2^*$ are given. In this embodiment, dividers 1 and 2 and coefficient element 3 for calculating slip frequency command $\omega_s$ from the torque command T* and secondary magnetic flux command $\Phi_2^*$ are omitted, and a multiplier 25 and a coefficient element 26 for calculating a torque component current command $i_{1q}^*$ by using slip frequency command $\omega_s$ are newly provided in place of the above-mentioned circuit components.

In the embodiment of FIG. 6, calculation of the magnetic flux component current command $i_{1d}^*$ is carried out in the same manner as in the embodiment of FIG. 4. The torque component current command $i_{1q}^*$ is calculated as follows. Namely, slip frequency command $\omega_s$ and the secondary magnetic flux command $\Phi_2^*$ are multiplied at the multiplier 25, and an output from the multiplier 25 is multiplied by a coefficient 1/$R_2^*$ corresponding to the inverse number of the secondary resistance of the induction motor at the coefficient element 26. Thus, $-i_{2q}^*$ is determined by calculation Thereafter, $-1_{2q}^*$ is multiplied by a coefficient $l_2^*$ corresponding to the secondary leakage inductance of the induction motor at the coefficient element 6, and an output from the coefficient element 6 is multiplied by a coefficient 1/M* corresponding to the inverse number of the mutual inductance of the induction motor at the multiplier 7. Thus, $i_{0q}^*$ is determined by calculation. Further, $-i_{2q}^*$ and $i_{0q}^*$ are added at the adding/subtracting element 8. Thus, a torque component current command $i_{1q}^*$ is determined by calculation. Accordingly, the torque component current command $i_{1q}^*$ has the relationship expressed by the following equation (25):

$$i_{1q}^* = \omega_s \times \Phi_2^*/R_2^* + (\omega_s \times \Phi_2^*/R_2^* \times l_2^*)/M^* \quad (25)$$

In accordance with this embodiment, in the case where the slip frequency command $\omega_s$ and the secondary magnetic flux command $\Phi_2^*$ are given, the coefficient 1/M* of the coefficient elements 7 and 11 is caused to be varied as a function of the magnitude of the gap magnetic flux $\Phi_0^*$ in correspondence with the magnetic saturation of the induction motor in the same manner as in the embodiment of FIG. 4, thereby making it possible to cancel the influence of the magnetic saturation. Accordingly, even if there is any magnetic saturation, it is possible to stably control the induction motor by a quick response while precisely controlling the secondary magnetic flux.

It is to be noted that since there are various known arts as the circuit sections (reference numerals 13-22) for controlling the primary current of the induction motor on the basis of the magnetic flux component current command $i_{1d}^*$, the torque component current command $i_{1q}^*$, the slip frequency command $\omega_s$ and the rotational frequency $\omega_r$, they may be suitably used.

What is claimed is:

1. A method of controlling an induction motor, which controls a primary current of the induction motor on the basis of a magnetic flux component current command ($i_{1d}^*$), a torque component current command ($i_{1q}^*$), and a slip frequency command ($\omega_s$) which are orthogonal component command values of the primary current of the induction motor, comprising the steps of:

receiving a torque command (T*) and a secondary magnetic flux command ($\Phi_2^*$);

setting a first, second and third control parameter $R_2^*$, $l_2^*$ and M* in accordance with a secondary resistance $R_2$, a secondary leakage inductance $l_2$ and a mutual inductance M of the induction motor, respectively; and calculating the magnetic flux component current command ($i_{1d}^*$), the torque component current command ($i_{1q}^*$) and the slip frequency command ($\omega_2$) in accordance with $R_2^*$, $l_2^*$, M*, T* and $\Phi_2^*$, as given by the following equations:

$$i_{1d}^* = (d\Phi_2^*/dt)/R_2^* + (\Phi_2^* + (d\Phi_2^*/dt)/R_2^* \times l_2^*)/M^*$$

$$i_{1q}^* = T^*/\Phi_2^* + (T^*/\Phi_2^* \times l_2)/M^*$$

$$\omega_s = T^*/\Phi_2^{*2} \times R_2^*.$$

2. A method of controlling an induction motor, which controls a primary current of the induction motor on the basis of a magnetic flux component current command ($i_{1d}^*$), a torque component current command ($i_{1q}^*$), and a slip frequency command ($\omega_s$) which are orthogonal component command values of the primary current of the induction motor, comprising the steps of:

receiving a secondary magnetic flux command ($\Phi_2^*$) and the slip frequency command ($\omega_s$);

setting a first, second and third control parameter $R_2^*$, $l_2^*$ and M* in accordance with a secondary resistance $R_2$, a secondary leakage inductance $l_2$ and a mutual induction M of the induction motor, respectively; and calculating the magnetic flux component current command ($i_{1d}^*$), and the torque component current command ($i_{1q}^*$) in accordance with $R_2^*$, $l_2^*$, M* and $\Phi_2^*$, as given by the following equations:

$$i_{1d}^* = (d\Phi_2^*/dt)/R_2^* + (\Phi_2^* + (d\Phi_2^*/dt)/R_2^* \times l_2^*)/M^*$$

$$i_{1q}^* = \omega_s \times \Phi_2^*/R_2^* + (\omega_s \times \Phi_2^*/R_2^* \times l_2^*)/M^*.$$

3. A method of controlling an induction motor, comprising the steps of:
- a) receiving a torque command and a magnetic flux command;
- b) dividing said torque command by said magnetic flux command, and outputting a first divided signal as a result thereof;
- c) dividing said first divided signal by said magnetic flux command and outputting a second divided signal as a result thereof;
- d) multiplying said second divided signal by a first coefficient corresponding to a secondary resistance of said induction motor, and outputting a slip frequency command as a result thereof;
- e) multiplying said first divided signal by a second coefficient corresponding to a secondary leakage inductance of said induction motor and outputting a first multiplied signal as a result thereof;
- f) receiving a gap magnetic flux of said induction motor, and outputting a third coefficient according to said gap magnetic flux;
- g) multiplying said first multiplied signal by said third coefficient, and outputting a second multiplied signal as a result thereof;
- h) adding said second multiplied signal to said first divided signal, and outputting a torque current component command as a result thereof;
- i) determining a magnetic flux current component command according to said magnetic flux command;
- j) detecting a speed of said induction motor and outputting a speed signal as a result thereof;
- k) adding said speed signal to said slip frequency command, and outputting a synchronous frequency as a result thereof;
- l) receiving said synchronous frequency and generating a two-phase sine wave according to said synchronous frequency;
- m) converting said magnetic flux current component command into a two-phase ac magnetic flux current component command according to said two-phase sine wave;
- n) converting said torque current component command into a two-phase ac torque current component command according to said two-phase sine wave;
- o) receiving said two-phase ac magnetic flux current component command and said two-phase torque current component command and outputting a first, second and third ac current command as a result of a two-phase to three-phase conversion; and
- p) receiving said first, second and third ac current commands by a controller and outputting a first, second and third primary current control command to control said speed of said induction motor.

4. The method as recited in claim 3, wherein the step i) further comprises the steps of:
- 1) differentiating said magnetic flux command and outputting a differential magnetic flux current component command as a result thereof;
- 2) multiplying said differential magnetic flux current component command by a fourth coefficient corresponding to an inverse number of said secondary resistance of said induction motor and outputting a third multiplied signal as a result thereof;
- 3) multiplying said third multiplied signal by second coefficient corresponding to said secondary leakage inductance of said induction motor and outputting a fourth multiplied signal as a result thereof;
- 4) adding said magnetic flux command to said fourth multiplied signal and outputting a first added signal as a result thereof;
- 5) multiplying said first added signal by third coefficient and outputting a fifth multiplied signal as a result thereof; and
- 6) adding said fifth multiplied signal to said third multiplied signal and outputting said magnetic flux current component command as a result thereof.

5. The method as recited in claim 4, wherein the steps m) and n) further comprise the steps of:
- 1) multiplying said torque current component command by said two-phase sine wave and outputting a sixth multiplied signal as a result thereof;
- 2) multiplying said magnetic flux current component command by said two-phase sine wave and outputting a seventh multiplied signal as a result thereof;
- 3) adding said sixth multiplied signal to said seventh multiplied signal and outputting a second added signal as said two-phase ac magnetic current component command as a result thereof; and
- 4) subtracting said sixth multiplied signal from said seventh multiplied signal and outputting a third added signal as said two-phase ac torque current component command as a result thereof.

6. An apparatus for controlling an induction motor, comprising:
- means for receiving a torque command and a magnetic flux command;
- a first divider connected to receive said torque command and said magnetic flux command from said receiving means, and outputting a first divided signal as a result of dividing said torque command by said magnetic flux command;
- a second divider connected to receive said first divided signal from said first divider and said magnetic flux command from said receiving means, and outputting a second divided signal as a result of dividing first divided signal by said magnetic flux command;
- a first multiplier connected to receive said second divided signal from said second divider, and outputting a slip frequency command as a result of multiplying said second divided signal by a first coefficient stored in said first multiplier, said first coefficient corresponding to a secondary resistance of said induction motor;
- a second multiplier connected to receive said first divided signal from said first divider, and outputting a first multiplied signal as a result of multiplying said first divided signal by a second coefficient stored in said first multiplier, said second coefficient corresponding to a secondary leakage inductance of said induction motor;
- a function generator connected to said induction motor for determining a gap magnetic flux of said induction motor, and outputting a third coefficient according to said gap magnetic flux;
- a third multiplier connected to receive said first multiplied signal from said second multiplier and said third coefficient from said function generator, and outputting a second multiplied signal as a result of multiplying said first multiplied signal by said third coefficient stored in said third multiplier;

a first adder connected to receive said second multiplied signal from said third multiplier and said first divided signal from said first divider, and outputting a torque current component command as a result of adding said second multiplied signal to said first divided signal;

means for determining a magnetic flux current component command according to said magnetic flux command;

means for detecting a speed of said induction motor, and outputting a speed signal according to said detected speed;

a second adder connected to receive said speed signal from said detecting means and said slip frequency command from said first multiplier, and outputting a synchronous frequency as a result of adding said speed signal to said slip frequency command;

a two-phase sine wave generator connected to receive said synchronous frequency, and outputting a two-phase sine wave according to said synchronous frequency;

means for converting said magnetic flux current component command into a two-phase ac magnetic flux current component command according to said two-phase sine wave;

means for converting said torque current component command into a two-phase ac torque current component command according to said two-phase sine wave;

a two-phase-to-three-phase converter connected to receive said two-phase ac magnetic flux current component command and said two-phase torque current component command, and outputting a first, second and third ac current command as a result of a two-phase-to-three-phase conversion performed therein; and a controller connected to receive said first, second and third ac current commands from said two-phase-to-three-phase converter and outputting a first, second and third primary current control command to control said speed of said induction motor.

7. The apparatus as recited in claim 6, wherein said determining means comprises:

a differentiator for differentiating said magnetic flux command, and outputting a differential magnetic flux current component command as a result thereof;

a fourth multiplier connected to receive said differential magnetic flux current component command from said differentiator, and outputting a third multiplied signal as a result of multiplying said differential magnetic flux current component command by a fourth coefficient stored in said fourth multiplier, said fourth coefficient corresponding to an inverse number of said secondary resistance of said induction motor;

a fifth multiplier connected to receive said third multiplied signal from said fourth multiplier, and outputting a fourth multiplied signal as a result of multiplying said third multiplied signal by said second coefficient stored in said fifth multiplier;

a second adder connected to receive said magnetic flux command from said receiving means and said fourth multiplied signal from said fifth multiplier, and outputting a first added signal as a result of adding said magnetic flux command to said fourth multiplied signal;

a sixth multiplier connected to receive said first added signal from said second adder, and outputting a fifth multiplied signal as a result of multiplying said second added signal by said third coefficient; and a third adder connected to receive said fifth multiplied signal from said sixth multiplier and said third multiplied signal from said fourth multiplier, and outputting said magnetic flux current component command as a result of adding said fifth multiplied signal to said third multiplied signal.

8. The apparatus as recited in claim 7, wherein said means for converting said torque current component command comprises:

a seventh multiplier connected to receive said torque current component command from said first adder and said two-phase sine wave from said two-phase sine wave generator, and outputting a sixth multiplied signal as a result of multiplying said torque current component command by said two-phase sine wave;

an eighth multiplier connected to receive said magnetic flux current component command from said determining means and said two-phase sine wave from said two-phase sine wave generator, and outputting a seventh multiplied signal as a result of multiplying said magnetic flux current component command by said two-phase sine wave; and a fourth adder connected to receive said sixth multiplied signal from said seventh multiplier and said seventh multiplied signal from said eighth multiplier, and outputting a second added signal as said two-phase ac torque current component command as a result of adding said sixth multiplied signal to said seventh multiplied signal.

9. The apparatus as recited in claim 8, wherein said means for converting said magnetic flux current component command comprises:

a ninth multiplier connected to receive said magnetic flux current component command from said determining means and said two-phase sine wave from said two-phase sine wave generator, and outputting an eighth multiplied signal as a result of multiplying said magnetic flux current component command by said two-phase sine wave;

a tenth multiplier connected to receive said torque current component command from said second adder and said two-phase sine wave from said two-phase sine wave generator, and outputting a ninth multiplied signal as a result of multiplying said torque current component command by said two-phase sine wave; and a subtracter connected to receive said eighth multiplied signal from said ninth multiplier and said ninth multiplied signal from said tenth multiplier, and outputting a subtracted signal as said two-phase ac magnetic flux current component command as a result of subtracting said eighth multiplied signal from said ninth multiplied signal.

10. A method of controlling an induction motor, comprising the steps of:

a) receiving a slip frequency command and a magnetic flux command;

b) multiplying said slip frequency command by said magnetic flux command, and outputting a first multiplied signal as a result thereof;

c) multiplying said first multiplied signal by a first coefficient corresponding to an inverse number of a secondary resistance of the induction motor, and outputting a second multiplied signal as a result thereof;

d) multiplying said second multiplied signal by a second coefficient corresponding to a secondary leakage inductance of said induction motor, and outputting a third multiplied signal as a result thereof;

e) determining a gap magnetic flux of said induction motor by a function generator, and outputting a third coefficient according to said gap magnetic flux;

f) multiplying said third multiplied signal by said third coefficient, and outputting a fourth multiplied signal as a result thereof;

g) adding said second multiplied signal to said fourth multiplied signal, and outputting a torque current component command as a result thereof;

h) determining a magnetic flux current component command according to said magnetic flux command;

i) detecting a speed of said induction motor, and outputting a speed signal as a result thereof;

j) adding said speed signal to said slip frequency command, and outputting a synchronous frequency as a result thereof;

k) receiving said synchronous frequency and generating a two-phase sine wave according to said synchronous frequency;

l) converting said magnetic flux current component command into a two-phase ac magnetic flux current component command according to said two-phase sine wave;

m) converting said torque current component command into a two-phase ac torque current component command according to said two-phase sine wave;

n) receiving said two-phase ac magnetic flux current component command and said two-phase torque current component command, and outputting a first, second and third ac current command as a result of a two-phase to three-phase conversion; and o) receiving said first, second and third ac current commands by a controller and outputting a first, second and third primary current control command to control said speed of said induction motor.

11. The method as recited in claim 10, wherein the step h) further comprises the steps of:

1) differentiating said magnetic flux command, and outputting a differential magnetic flux current component command as a result thereof;

2) multiplying said differential magnetic flux current component command by a fourth coefficient corresponding to an inverse number of said secondary resistance of said induction motor, and outputting a fifth multiplied signal as a result thereof;

3) multiplying said fifth multiplied signal by said second coefficient corresponding to said secondary leakage inductance of said induction motor, and outputting a sixth multiplied signal as a result thereof;

4) adding said magnetic flux command to said sixth multiplied signal, and outputting a first added signal as a result thereof;

5) multiplying said first added signal by said third coefficient, and outputting a seventh multiplied signal as a result thereof; and 6) adding said seventh multiplied signal to said fifth multiplied signal, and outputting said magnetic flux current component command as a result thereof.

12. The method as recited in claim 11, wherein the steps l) and m) further comprise the steps of:

1) multiplying said torque current component command by said two-phase sine wave, and outputting a eighth multiplied signal as a result thereof;

2) multiplying said magnetic flux current component command by said two-phase sine wave, and outputting a ninth multiplied signal as a result thereof;

3) adding said eighth multiplied signal to said ninth multiplied signal, and outputting a second added signal as said two-phase ac magnetic current component command as a result thereof; and 4) subtracting said eighth multiplied signal from said ninth multiplied signal, and outputting a subtracted signal as said two-phase ac torque current component command as a result thereof.

13. An apparatus for controlling an induction motor, comprising:

means for receiving a slip frequency command and a magnetic flux component command;

a first multiplier connected to receive said slip frequency command and said magnetic flux component command from said receiving means, and outputting a first multiplied signal as a result of multiplying said magnetic flux component command and said slip frequency command;

a second multiplier connected to receive said first multiplied signal from said first multiplier, and outputting a second multiplied as a result of multiplying said first multiplied signal by a first coefficient stored in said second multiplier, said first coefficient corresponding to an inverse number of a secondary resistance of the induction motor;

a third multiplier connected to receive said second multiplied signal from said second multiplier, and outputting a third multiplied signal as a result of multiplying said second multiplied signal by a second coefficient stored in said third multiplier, said second coefficient corresponding to a secondary leakage inductance of said induction motor;

a function generator connected to receive a gap magnetic flux from said induction motor, and outputting a third coefficient according to said gap magnetic flux;

a fourth multiplier connected to receive said third multiplied signal from said third multiplier, and outputting a fourth multiplied signal as a result of multiplying said third multiplied signal by said third coefficient;

a first adder connected to receive said second multiplied signal from said second multiplier and said fourth multiplied signal from said fourth multiplier, and outputting a torque current component command as a result of multiplying said second multiplied signal by said fourth multiplied signal;

means for determining a magnetic flux current component command according to said magnetic flux component command;

means for detecting a speed of said induction motor and outputting a speed signal as a result of said speed;

a second adder connected to receive said speed signal from said detecting means and said slip frequency command from said receiving means, and outputting a synchronous frequency as a result of adding said speed signal to said slip frequency command;

a two-phase sine wave generator connected to receive said synchronous frequency from said second adder, and generating a two-phase sine wave according to said synchronous frequency;

means for converting said magnetic flux current component command into a two-phase ac magnetic flux current component command according to said two-phase sine wave;

means for converting said torque current component command into a two-phase ac torque current component command according to said two-phase sine wave;

a two-phase-to-three-phase converter connected to receive said two-phase ac magnetic flux current component command and said two-phase torque current component command, and outputting a first, second and third ac current command as a result of a two-phase to three-phase conversion performed therein; and a controller connected to receive said first, second and third ac current commands from said two-phase-to-three-phase converter, and outputting a first, second and third primary current control command to control said speed of said induction motor.

14. The apparatus as recited in claim 13, wherein said determining means comprises:

a differentiator for differentiating said magnetic flux component command and outputting a differential magnetic flux current component command as a result thereof;

a fifth multiplier connected to receive said differential magnetic flux current component command from said differentiator and outputting a fifth multiplied signal as a result of multiplying said differential magnetic flux current component command by a fourth coefficient stored in said fifth multiplier, said fourth coefficient corresponding to an inverse number of said secondary resistance of said induction motor;

a sixth multiplier connected to receive said fifth multiplied signal from said fifth multiplier, and outputting a sixth multiplied signal as a result of multiplying said fifth multiplied signal by said second coefficient stored in said sixth multiplier, said second coefficient corresponding to said secondary leakage inductance of said induction motor;

a third adder connected to receive said magnetic flux component command from said receiving means and said sixth multiplied signal from said sixth multiplier, and outputting a first added signal as a result of adding said magnetic flux component command to said sixth multiplied signal;

a seventh multiplier connected to receive said first added signal from said third adder, and outputting a seventh multiplied signal as a result of multiplying said first added signal to said third coefficient; and a fourth adder connected to receive said seventh multiplied signal from said seventh multiplier and said fifth multiplied signal from said fifth multiplier, and outputting said magnetic flux current component command as a result of adding said seventh multiplied signal to said fifth multiplied signal.

15. The apparatus as recited in claim 14, wherein said means for converting said torque current component command comprises:

an eighth multiplier connected to receive said torque current component command from said first adder and said two-phase sine wave from said two-phase sine wave generator, and outputting an eighth multiplied signal as a result of multiplying said torque current component command by said two-phase sine wave;

a ninth multiplier connected to receive said magnetic flux current component command from said determining means and said two-phase sine wave from said two-phase sine wave generator, and outputting a ninth multiplied signal as a result of multiplying said magnetic flux current component command by said two-phase sine wave; and a fifth adder connected to receive said eighth multiplied signal from said eighth multiplier and said ninth multiplied signal from said ninth multiplier, and outputting a second added signal as said two-phase ac torque current component command as a result of adding said eighth multiplied signal to said ninth multiplied signal.

16. The apparatus as recited in claim 15, wherein said means for converting said magnetic flux current component command comprises:

a tenth multiplier connected to receive said magnetic flux current component command from said determining means and said two-phase sine wave from said two-phase sine wave generator, and outputting a tenth multiplied signal as a result of multiplying said magnetic flux current component command by said two-phase sine wave;

an eleventh multiplier connected to receive said torque current component command from said second adder and said two-phase sine wave from said two-phase sine wave generator, and outputting an eleventh multiplied signal as a result of multiplying said torque current component command by said two-phase sine wave; and a subtracter connected to receive said tenth multiplied signal from said tenth multiplier and said eleventh multiplied signal from said eleventh multiplier, and outputting a subtracted signal as said two-phase ac magnetic flux current component command as a result of subtracting said tenth multiplied signal from said eleventh multiplied signal.

* * * * *